United States Patent Office 2,932,211
Patented Apr. 12, 1960

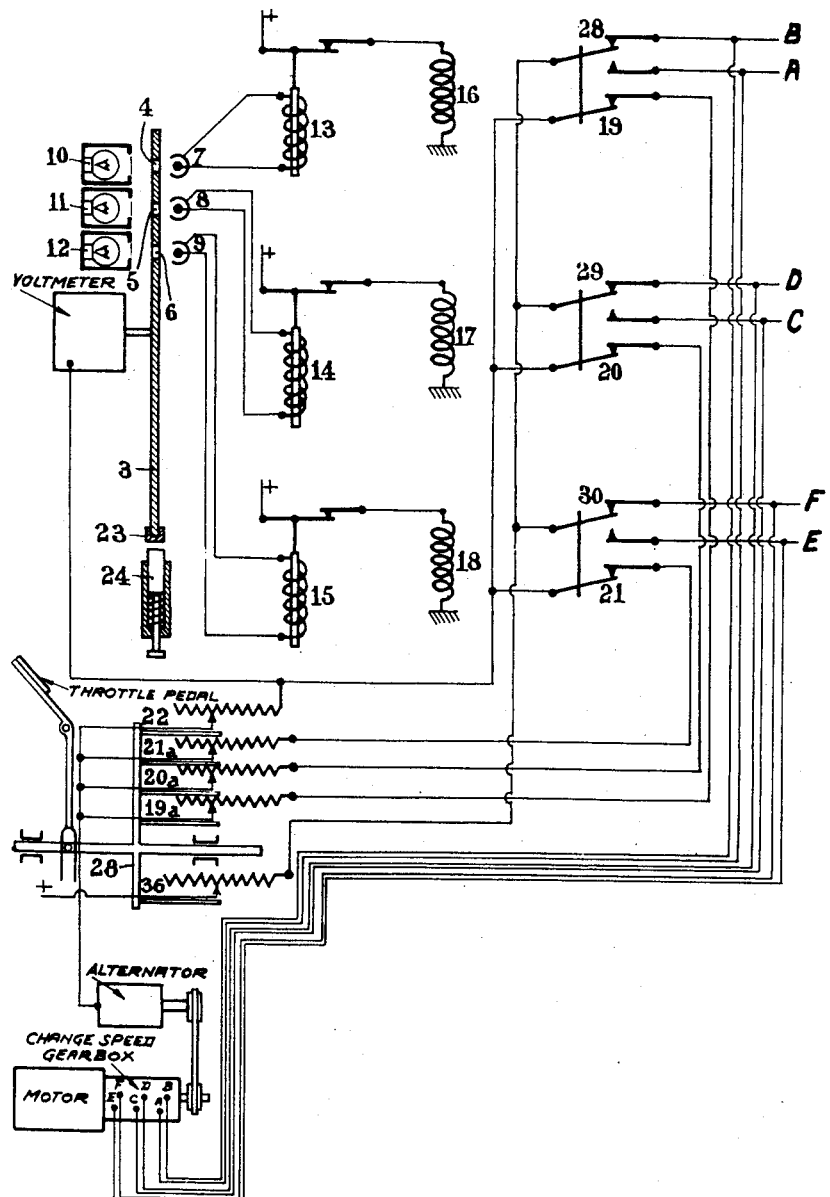

2,932,211

AUTOMATIC SERVO-ACTION DEVICE FOR CONTROLLING CHANGE SPEED GEARS

Jean-Michel Vernhes, Paris, France

Application July 16, 1957, Serial No. 672,194

5 Claims. (Cl. 74—472)

This invention relates to a servo-action device adapted to automatically control change-speed gears, the gear-ratio selection of which is defined by electrically-actuated clutches, this device being particularly suitable for vehicles driven by internal combustion engines.

This servo-action device is designed notably for change-speed gears of which the operation is effected by means of a series of reversing control contacts and more particularly for change-speed gears of the type comprising a series of epicyclic gear trains each responsive to a pair of electromagnets energized in both positions of one of said reversing contacts. It is particularly recommended for controlling change-speed transmissions providing a relatively high number of gear ratios and wherein the shifting times must be observed with maximum precision and reliability.

It is already known that the parameters determining these shifting times are the velocity of rotation of the output shaft of the change-speed gear and the engine load requirements.

It is the essential object of this invention to provide an automatic change-speed control device for an automotive vehicle driven by an internal combustion engine and equipped with a control change-speed gear provided with reversing electric contacts, this device being characterized in that an alternator rotatably driven from the output shaft of the change-speed gear delivers a current to a voltmeter the oscillating index member of which determines the angular position of a selector disc having several series of holes formed therein which are so positioned that for a given angular position of the disc one hole of each series registers with a lamp the light beam of which passes through the hole and actuates responsive means located on the other side of the disc which closes one of the control reversing contacts of the change-speed gear.

With this disc arrangement it is possible to select the change-speed gear control operations by means of photoelectric cells.

The correcting element subordinate to the engine load requirements is controlled by the amplitude of the movement impressed to the throttle control member for obtaining an instantaneous power output consistent with the momentary power requirements.

At this time the throttle controls a number of variable-resistor slides the positions of which are adapted to modify the value of electrical resistances inserted between the speed-measuring alternator and the input member.

The stability of the selected speeds is obtained through mild-steel elements secured at spaced intervals on the outer periphery of the disc of the receiving member, one of said mild-steel elements being attracted by a stationary magnetic element whereby the disc is slightly locked in the position in which the mild-steel element registers with the magnetic element.

This magnetic positioning of the disc determines a difference between the shifting speeds when changing up or down the range of gears, thereby avoiding the backlash most likely to occur when the vehicle attains a limit between its acceleration capacity and the reaction torque to be overcome.

The main control relays of the change-speed gear insert electric resistors in the circuit which are controlled by the throttle as the gears shift is effected from a lower to a higher gear. Thus, a variation in the value of the correction as a function of the engaged gear is obtained and any exaggerate corrections on the lower gears are substantially avoided.

According to the specific use for which the vehicle is intended, it may be advantageous to avoid changing down the range of gears until the vehicle comes to a standstill, without depressing the throttle pedal, especially in the case of town transport public vehicles making very frequent stops. In any case this invention permits when required the automatic selection of the lower gears when the vehicle is pulling with the throttle partially or completely depressed.

The automatic servo control means defined hereinabove provides correct gear selection under normal traffic conditions in all cases concerning acceleration, slowing down, uphill driving, but does not take care of downgrades and makes it impossible to automatically use the engine as an auxiliary retarding means amplified by the lower gears.

This drawback may be avoided according to this invention by correcting the output curve of the alternator by means of additional resistors inserted between the alternator and the input member.

These additional resistors may be inserted in the circuit either by means of a special lever or pedal actuatable by the driver, or automatically and notably from a minimum slope value, under the control of a clinometer or like down-slope measuring instrument.

The electromagnets of the change-speed gear are energized through a variable resistor inserted in the feed-circuit and controlled by the throttle pedal so as to deliver a low current for speed changes at low engine speed, this current increasing up to a maximum at which it is kept for the maximum engine torque.

These and other features and advantages of this invention will appear more clearly as the following description proceeds with reference to the attached drawing forming part of this specification and illustrating diagrammatically by way of example a typical lay-out of an automatic control installation according to this invention. In the drawing:

The single figure is a schematic diagram of the automatic servo-action device.

An apparatus for measuring the velocity of the vehicle is driven from a power take-off provided for example on the output side of the change-speed gear box mechanically connected to a motor. This apparatus may consist of an alternator delivering an electric current of a value proportional to the momentary speed of the vehicle. This electric current is fed to a receiving member consisting for example of a voltmeter. The deflection measured by the voltmeter is transmitted to a selector disc 3 in which several series of holes such as 4, 5 and 6 are formed, each series of holes corresponding to the combinations of electromagnets to be energized in connection with each train of gears of the transmission for selecting the gear ratio corresponding to the vehicle speed measured at this time by the receiver or voltmeter.

To each series of holes 4, 5 or 6 there corresponds one of the photoelectric cells 7, 8 and 9 which may be illuminated by one of the three lamps 10, 11 or 12 the light beams of which either pass through the holes 4, 5 or 6, or are blocked by the solid portions of the disc 3. The photoelectric cells 7, 8, 9 disposed on the other side of the disc 3 in front of or in alignment with the lamps 10, 11, 12 are each adapted, during the time in which they are illuminated by the relevant lamp, to deliver current to corresponding sensitive relay means 13, 14, 15 either directly or through the medium of a power amplifier.

The sensitive relay means 13, 14, 15 control in turn main reversing relays 16, 17, 18 according to the energization of coils 16, 17, 18 controlling electromagnetically reversing contacts 28, 29, 30 each adapted to deliver current to one of the terminals AB, CD or EF of an electrically controlled change-speed gear. This change-speed gear or transmission may be for example of the type described and illustrated in the copending U.S. Patent application No. 672,241 filed by the same applicant, and comprising a series of epicyclic trains each responsive to a pair of electromagnets, one of said electromagnets being rotatable and the other stationary, both being energized in the two positions, respectively, of one of the reversing contacts. Thus, the series of holes 4, 5, 6 control the energization of the servo electromagnets of the change-speed gear through the terminals AB, CD, EF. As a consequence, the gear ratio is changed up or down as a function of the velocity of the vehicle.

The element for correcting the time of the gear shift as a function of the engine load requirements is given by a modification of the output value of the alternator 1 which corresponds to each velocity.

The value to be chosen for this correction varies according to the engine load requirements and to the relationship obtaining between the different ratios of the change-speed gear.

This modification of the alternator output may be effected by providing a number of variable resistors 10a, 20a, 21a of predetermined value which are adapted to be inserted in or disconnected from the circuit by means of additional contacts 19, 20 or 21 respectively solid with reversing contacts 28, 29 and 30 and to another variable resistance 22 permanently connected in the circuit.

The value of the variable resistors inserted in the circuit for a given velocity is then determined by the position of a control device 28 operatively connected to the throttle pedal 28 and imparting to the resistor slides a movement substantially proportional to the depression of the accelerator pedal.

It is necessary to provide different gear-shift points according as the change is effected to an upper or a lower gear of the range available, if it is desired to avoid any detrimental back-lash between adjacent gears when the vehicle speed is kept to a value close to the shifting point. To this end, the invention comprises a mild-steel point 23 secured on the outer periphery of the selector disc 3. Surrounding this disc 3 and radially thereto are secured on the other hand as many magnetic elements 24 as there are gears to be selected.

When the disc 3 rotates as a consequence of a variation in the current delivered by the alternator, the point 23 moves towards one of the magnetic elements 24 and is attracted by and retained in front of this element until it is definitely displaced towards the preceding or following element.

The attraction or retaining force available may be adjusted by altering the position of these magnetic elements 24 relative to the disc; under these conditions, these magnetic elements 24 may advantageously be mounted in an adjustable position. The magnetic elements 24 are so disposed as to hold the selector disc between the change-gear positions of the gear selection.

The reversing contacts 28, 29, 30 of the main reversing relays 16, 17 and 18 respectively are fed with electric current through a variable resistor under the control of the device 22 operatively connected to the throttle pedal. This variable resistor gives a low current for gear-changes taking place at low engine speed, this current increasing up to a maximum value at which it is maintained for the maximum engine torque.

What I claim is:

1. An automatic control device for change-speed gears of a vehicle driven by an internal combustion engine and equipped with a change-speed gear having a number of reversing control contacts and an output shaft, an alternator rotatably driven from said output shaft, an electric circuit receiving the output from said alternator, a voltmeter inserted in said circuit and having an oscillating index member, a rotatably mounted selector disc the annular position of which is subordinate to that of said oscillating index member, said disc having formed therethrough a number of concentric series of apertures which number is equal to that of said reversing control contacts, a same number of lamps positioned on one side of said disc, each of said lamps being adapted to direct a light beam towards one of said concentric series of apertures, a same number of responsive elements mounted on the other side of the disc and registering with said lamps respectively, said responsive element being adapted, when it receives through one aperture the light beam emitted from the registering lamp, to emit a current, and a same number of electromagnetic means co-acting with said responsive elements, each of said electromagnetic means being adapted to close one of the reversing control contacts of said change-speed gears when it receives current from one of said responsive elements.

2. An automatic control device as set forth in claim 1 for a vehicle provided with a throttle pedal, wherein said electric circuit fed from said alternator comprises between said alternator and said voltmeter a number of branch lines, there being as many branch lines as reversing contacts in said change-speed gear, a same number of break switches operatively connected to said reversing contacts, each of said break switches closing said branch line when the relevant reversing contact is closed, a same number of resistors mounted in said branch lines, and means for adjusting said resistors which are actuated as a function of the displacement of the throttle pedal.

3. An automatic control device as set forth in claim 1 for a vehicle provided with a throttle pedal, wherein said electric circuit fed from said alternator comprises between said alternator and said voltmeter a resistor and means for adjusting said resistor which are actuated by the displacement of the throttle pedal.

4. An automatic control device as set forth in claim 1 for a vehicle provided with a circuit for energizing contacts controlling the change-speed gear and a throttle pedal, wherein said last-mentioned circuit comprises in turn a resistor and means for adjusting said resistor which are actuated by the movement of the throttle pedal.

5. An automatic control device as set forth in claim 1, comprising a series of magnetic elements radially secured on the outer periphery of said selector disc and a mild-steel point secured on said periphery and tending to hold said disc in an angular position such that said mild-steel point registers with one of said magnetic elements.

References Cited in the file of this patent

UNITED STATES PATENTS

| | | |
|---|---|---|
| 2,311,142 | Turrettini | Feb. 16, 1943 |
| 2,339,976 | Brown | Jan. 25, 1944 |